United States Patent
Watanabe et al.

(10) Patent No.: US 8,197,929 B2
(45) Date of Patent: *Jun. 12, 2012

(54) ALIPHATIC POLYESTER BASED RESIN REFLECTION FILM AND REFLECTION PLATE

(75) Inventors: Takayuki Watanabe, Nagahama (JP); Takashi Hiruma, Nagahama (JP); Kazunari Katsuhara, Nagahama (JP); Miki Nishida, Nagahama (JP); Jun Takagi, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 537 days.

This patent is subject to a terminal disclaimer.

(21) Appl. No.: 12/007,748

(22) Filed: Jan. 15, 2008

(65) Prior Publication Data

US 2008/0138601 A1 Jun. 12, 2008

Related U.S. Application Data

(62) Division of application No. 10/557,205, filed as application No. PCT/JP2004/007280 on May 20, 2004, now Pat. No. 7,754,324.

(30) Foreign Application Priority Data

May 20, 2003 (JP) .................................. 2003-141435
Jun. 9, 2003 (JP) .................................. 2003-163386

(51) Int. Cl.
*B32B 3/26* (2006.01)
*B32B 5/22* (2006.01)
*B32B 9/00* (2006.01)

(52) U.S. Cl. ................ 428/304.4; 428/317.9; 428/318.4
(58) Field of Classification Search ............... 428/304.4, 428/317.9, 318.4
See application file for complete search history.

(56) References Cited

U.S. PATENT DOCUMENTS

| 4,089,675 | A | 5/1978 | Preston et al. |
| 6,846,606 | B1 | 1/2005 | Laney et al. |
| 2002/0122146 | A1 | 9/2002 | Koyama et al. |
| 2005/0112351 | A1 | 5/2005 | Laney et al. |
| 2005/0121620 | A1 | 6/2005 | Laney et al. |

FOREIGN PATENT DOCUMENTS

| JP | 53-45699 | | 4/1978 |
| JP | 5-209073 | | 8/1993 |
| JP | 06067174 | A * | 3/1994 |
| JP | 2001049004 | A * | 2/2001 |
| JP | 2002-138150 | | 5/2002 |
| JP | 2002-258015 | | 9/2002 |
| JP | 2003-207609 | | 7/2003 |
| JP | 2003261704 | A * | 9/2003 |
| JP | 2003-342404 | | 12/2003 |
| WO | 2005/052655 | | 6/2005 |
| WO | 2005/052952 | | 6/2005 |

OTHER PUBLICATIONS

English translation of JP 06067174, see above for date and inventor.*
English translation of JP 2001049004, see above for date and inventor.*
English abstract of JP 2003-261704, see above for date and inventor.*

* cited by examiner

*Primary Examiner* — Victor Chang
(74) *Attorney, Agent, or Firm* — Kratz, Quintos & Hanson, LLP

(57) ABSTRACT

To obtain a reflection film that does not undergo yellowing or a reduction in reflectance with a lapse of time by using, has excellent deadfold properties, generates less calorific when incinerated, and is degradable by microorganisms when subjected to earth filling, and causes no problem of waste disposal, the reflection film includes an aliphatic polyester based resin as a base resin and fine powder filler. The reflection film has pores inside thereof at a porosity of 50% or less. Preferably, the fine powder filler includes titanium oxide.

7 Claims, No Drawings

ALIPHATIC POLYESTER BASED RESIN REFLECTION FILM AND REFLECTION PLATE

CROSS REFERENCE TO RELATED APPLICATION

This application is a divisional of U.S. Ser. No. 10/557,205 filed Nov. 17, 2005 now U.S. Pat. No. 7,754,324, which is the U.S. national stage of International Application No. PCT/JP2004/007280, filed May 20, 2004, which was published under PCT Article 21(2) as Publication No. WO 2004/104077 and of which the instant application claims the benefit, which in turn claims the benefits of Japan Patent Application No. 2003-141435, filed May 20, 2003, and Japan Patent Application No. 2003-163386, filed Jun. 9, 2003. All these applications are incorporated herein by reference in their entirety.

TECHNICAL FIELD

The present invention relates to an aliphatic polyester based resin reflection film, in particular, a polyester based resin reflection film for use in reflection plates in liquid crystal displays, lighting equipment, illumination advertising displays and so on.

BACKGROUND ART

Japanese Patent Application Laid-open No. Hei 4-239540 discloses a film made of an aromatic polyester resin that serves as a reflection film for use in reflection plates in liquid crystal displays. This film has a problem in that the aromatic rings contained in the molecular chain of the aromatic polyester resin absorb ultraviolet rays and hence when the reflection film is exposed to ultraviolet rays, it is deteriorated and undergoes yellowing, resulting in that the reflectance of the reflection film is decreased. Further, Japanese Patent Application Laid-open No. Hei 11-174213 discloses a film made of a polypropylene resin as a reflection film. This film has a problem in that when the film is to be disposed of, incineration of the polypropylene resin damages the incineration furnace since the polypropylene resin generates heat with a high calorific value. A further problem is, for example, that since plastics such as polypropylene resins are stable for a long time in natural surroundings, disposal of such plastics by earth filling allows the plastics to remain in soil for a long time, so that the service life of garbage landfills is shortened and damage the scenery and life circle for wild animals and plants.

Further, films made of polypropylene resins containing 60 mass % or more of inorganic fillers can not ensure sufficient film strengths so that such films tend to be broken during drawing and there is the fear of a decrease in stability in film production.

Reflection films for use as reflection plates in liquid crystal displays are required to have shape-retaining properties, that is, properties by which the reflection films can retain their shape when they are folded. Conventional reflection films have a defect that they have low "dead fold" properties.

DISCLOSURE OF THE INVENTION

The present invention has been accomplished with a view to solving the above-mentioned problems. It is an object of the present invention to provide a reflection film that shows neither yellowing nor a decrease in reflectance with time during use and that has excellent deadfold properties and in addition generates heat with a low calorific value when incinerated or is capable of being degraded by microorganisms when subjected to landfill operations, causing no problems for its disposal.

The aliphatic polyester based resin reflection film of the present invention contains fine powder filler and has voids inside of the film such that the voids occupy 50% or less of a total volume of the film.

Here, it is preferable that the fine powder filler contains at least titanium oxide.

Preferably, a content of vanadium in the titanium oxide is 5 ppm or less.

In the present invention, the fine powder filler may be contained in an amount of 10 mass parts or more and 60 mass parts or less per 100 mass parts of the aliphatic polyester resin.

When the aliphatic polyester based resin reflection film of the present invention has voids, it is preferable that the film has a void ratio of 5% or more and 50% or less.

In the present invention, it is preferable that the aliphatic polyester based resin has a refractive index of less than 1.50.

Further, it is preferable that a difference between the refractive index of the aliphatic polyester based resin and the refractive index of the fine powder filler is 0.15 or more.

The aliphatic polyester based resin may be a lactic acid based resin.

The aliphatic polyester based resin reflection film of the present invention may be a film obtained by drawing at least in one direction a film that is fusion-formed from a resin composition containing an aliphatic polyester based resin and a fine powder filler such that the film has an area magnification of 5 factors or more.

Preferably, the shrinkage factor of the film after storage at 80° C. for 3 hours is larger than 0% and less than 0.7% in a longitudinal direction and −0.1% or more and 0.5% or less in a transversal direction.

The reflection plate of the present invention is featured by having any one of the above-mentioned aliphatic polyester based resin reflection films. The reflection plate of the present invention can be formed, for example, by applying any of the aliphatic polyester based resin reflection films to a metal plate or a resin plate and can be used as a reflection plate for liquid crystal displays, a reflection plate for lighting equipment, a reflection plate for illumination advertising displays and so on.

BEST MODE FOR CARRYING OUT THE INVENTION

Hereinafter, the present invention is explained in detail.

The aliphatic polyester based resin reflection film of the present invention contains therein a fine powder filler.

The fine powder fillers used in the present invention include organic fine powders and inorganic fine powders. The organic fine powder is at least one member selected from, preferably cellulose-based powders such as wood powder and pulp powder, polymer beads, and hollow polymer beads.

The inorganic fine powder is at least one member selected from, preferably calcium carbonate, magnesium carbonate, barium carbonate, magnesium sulfate, barium sulfate, calcium sulfate, zinc oxide, magnesium oxide, calcium oxide, titanium oxide, alumina, aluminum hydroxide, hydroxyapatite, silica, mica, talc, kaolin, clay, glass powder, asbestos powder, zeolite, and clay silicate. Taking the light reflecting properties of the obtained film, the fine powder filler preferably has a large difference in refractive index from the base resin that constitutes the film. That is, the inorganic fine powder preferably has a high refractive index. Specifically, it is more preferable to use calcium carbonate, barium sulfate, titanium oxide or zinc oxide each having a refractive index of 1.6 or more. Among these, most preferably, titanium oxide is used. Use of titanium oxide allows the film to be imparted with high reflecting performance in small amounts of the filler. Further, use of titanium oxide can provide films having high reflecting performance even if they are thin.

In the present invention, it is particularly preferable that among titanium oxide, high-purity titanium oxide having a high-purity be used. The high-purity titanium oxide in the present invention means titanium oxide that has low light absorbing performance with respect to visible light and a low content of coloring elements such as vanadium, iron, niobium, copper, and manganese. In the present invention, titanium oxide of which a content of vanadium contained is 5 ppm or less is called "high-purity titanium oxide". The high-purity titanium oxide preferably has reduced amounts of coloring elements such as iron, niobium, copper, and manganese from the viewpoint of making the light absorbing performance lower.

Examples of the titanium oxides used in the present invention include titanium oxides of crystal forms such as anatase type titanium oxide and rutile type titanium oxide. From the viewpoint of increasing the difference in refractive index from the base resin, the titanium oxide is preferably one having a refractive index of 2.7 or more, for example, of a crystal form of rutile type titanium oxide.

The titanium oxide having a vanadium content of 5 ppm or less includes, for example, one produced by a chlorine process. In the chlorine process, rutile ore that is composed mainly of titanium oxide is reacted with chlorine gas in a high temperature oven at about 1,000° C. to generate titanium tetrachloride first. Then, burning the titanium tetrachloride with oxygen affords high-purity titanium oxide. Methods of producing titanium oxide on an industrial scale include a sulfuric acid process. However, the titanium oxide obtained by this process contains a relatively large amount of coloring elements such as vanadium, iron, copper, manganese, and niobium, so that the titanium oxide has a higher light absorbing performance for visible light. Accordingly, it is difficult to obtain high-purity titanium oxide that can be used in the present invention by the sulfuric acid method.

In the present invention, the fine powder filler may be a combination of the inorganic fine powder and the organic fine powder. Further, two or more kinds of fine powder fillers can be used in combination. For example, titanium oxide and other fine powder filler can be used in combination and high-purity titanium oxide and other fine powder filler may be used in combination.

To improve the dispersibility of the fine powder filler in the resin, those fine powder fillers whose surface has been treated with a silicone compound, a polyhydric alcohol compound, an amine compound, a fatty acid, a fatty acid ester or the like may be used. For example, to improve the dispersibility of titanium oxide in an aliphatic polyester based resin, and suppress the photocatalytic activity of titanium oxide, the surface of titanium oxide may be subjected to surface treatment.

The surface treating agents that can be used include, for example, at least one inorganic compound selected from the group consisting of alumina, silica, and zirconia, and at least one organic compound selected from the group consisting of a siloxane compound, a silane coupling agent, a polyol, and polyethylene glycol. The inorganic compounds and the organic compounds may be used in combination.

The fine powder filler used in the present invention preferably has a particle diameter of 0.05 µm or more and 15 µm or less, more preferably 0.1 µm or more and 10 µm or less. When the particle diameter of the fine powder filler is 0.05 µm or more, the dispersibility of the fine powder filler in the aliphatic polyester based resin does not decrease, so that a uniform film can be obtained therefrom. On the other hand, when the particle diameter of the fine powder filler is 15 µm or less, the voids formed are not coarse, so that films having a high reflectance can be obtained.

The high-purity titanium oxide used in the present invention has a particle diameter of, preferably 0.1 µm or more and 1 µm or less, more preferably 0.2 µm or more and 0.5 µm or less. When the particle diameter of the high-purity titanium oxide is 0.1 µm or more, the dispersibility of the high-purity titanium oxide in the aliphatic polyester based resin is good, so that uniform films can be obtained. On the other hand, when the particle size of the high-purity titanium oxide is 1 µm or less, an interface between the aliphatic polyester based resin and the titanium oxide is formed accurately, so that the reflection films can be imparted with high light reflecting properties.

Preferably, the fine powder filler is blended in the aliphatic polyester based resin in a dispersed manner. The content of the fine powder filler in the reflection film of the present invention, taking into consideration, for example, the light reflecting properties, mechanical properties, and productivity of the film, is 10 mass % or more and 60 mass % or less, more preferably 10 mass % or more and less than 55 mass %, and particularly preferably 20 mass % or more and 50 mass % or less based on the total mass of the aliphatic polyester based resin composition that is used for forming the reflection film. When the content of the fine powder filler is 10 mass % or more, a sufficient area of interface between the resin and the fine powder filler can be ensured, so that the film can be imparted with a high light reflecting properties. On the other hand, when the content of the fine powder filler is 60 mass % or less, the mechanical properties that are necessary for films can be ensured.

The aliphatic polyester based resin reflection film of the present invention has voids inside of the film such that the film has a void ratio (a ratio in which the voids occupy in the film) of 50% or less of a total volume of the film. The voids referred to herein means closed cells but not open cells or through holes. However, it is sufficient that most of the voids are closed cells; and the presence of through holes and open cells is not strictly excluded. In the present invention, the fine powder filler contained in an effectively dispersed state in the inside of the film realizes excellent reflectance.

When the aliphatic polyester based resin reflection film of the present invention has voids in the film, it is preferable that the ratio of the voids in which the voids occupy the film (void ratio) is in the range of 5% or more and 50% or less. More preferably, the void ratio is 20% or more and particularly preferably 30% or more. When the void ratio is more than 50%, the mechanical strength of the film decrease, so that the film may be broken during film production or the durability of the film such as heat resistance may be insufficient when in use. For example, voids can be formed in a film by drawing the film after addition of the fine powder filler to the composition for producing the film.

When titanium oxide is used as the fine powder filler, high light reflecting properties can be obtained at a lower void ratio. For example, a satisfactory high light reflecting properties can be attained at a void ratio of 15% or less. Presumably, this is ascribable to the high refractive index and hence high hiding power of titanium oxide. If the amount of the filler to be used can be decreased, the number of voids formed during drawing is also decreased, so that the mechanical strength of the film can be increased while maintaining its good light reflecting performance. Further, even when a large amount of the filler is used, a decreased amount of drawing to decrease voids can similarly result in improved mechanical properties of the film. These are advantageous from the viewpoint of the dimension stability of the film. Further, even when the film is thin, if good light reflecting performance is ensured, the film can be used as a reflection film for small, thin liquid crystal displays for, for example, note-type personal computers and mobile phones.

The aliphatic polyester based resin reflection film of the present invention, even when it has no voids in the inside thereof, can realize high light reflecting properties if it contains high-purity titanium oxide that has a vanadium content of 5 ppm or less. Further, it can achieve a particularly high light reflecting properties when it contains high-purity titanium oxide and has voids therein.

The base resin that constitutes the reflection film of the present invention preferably has a refractive index (n) of less than 1.50. In the present invention, it is preferable to use an aliphatic polyester based resin having a refractive index of less than 1.50.

Resins having a refractive index (n) of less than 1.50 are preferably aliphatic resins containing no aromatic rings, and more preferably polylactic acid based resins. Resins containing aromatic rings, for example, aromatic resins have a refractive index of 1.55 or more. In the case of the reflection film that contains fine powder filler in the film, the light reflecting properties are imparted making use of inflection and scattering of light at interfaces in the film. Accordingly, the greater the difference in refractive index between the resin that constitutes the film and the fine powder filler is, the more readily high light reflecting properties can be imparted. In the present invention, the difference in refractive index is preferably 0.15 or more, and more preferably 0.20 or more. When the refractive index of the resin that constitutes the film is less than 1.5, it is easy to ensure the conditions under which the difference in refractive index from the refractive index of the fine powder filler is 0.15 or more. For example, polylactic acid based resins have a refractive index of about 1.45, so that the conditions under which the difference in refractive index from the fine powder filler is 0.15 or more can be readily achieved therewith and many kinds of fine powder fillers can be used in combination. On the contrary, resins containing aromatic rings have refractive indices of about 1.55 or more, the difference in refractive index from the fine powder filler tends to be smaller in many cases.

The aliphatic polyester based resins contain no aromatic rings in the molecular chain and hence does not absorb ultraviolet rays. Therefore, films do not deteriorate and yellow with ultraviolet rays generated from a light source in liquid crystal displays and the like, so that the light reflecting properties are not decreased.

The aliphatic polyester based resins that can be used include those chemically synthesized, those obtained by fermentation by microorganisms and mixtures of these. Examples of the chemically synthesized aliphatic polyester based resins include poly($\epsilon$-caprolactam) obtained by ring-opening polymerization of lactone, polyethylene adipate, polyethylene azelate, polytetramethylene succinate, cyclohexanedicarboxylic acid/cyclohexanedimethanol condensation products and so on, which are obtained by polymerization of a dibasic acid and a diol, polylactic acids, polyglycols and so on, which are obtained by polymerizing hydroxycarboxylic acid, and aliphatic polyesters obtained by substituting a portion, for example, 50% or less of ester bonds in the above-mentioned aliphatic polyesters has been replaced by one or more of, for example, a amido bond, an ether bond, and a urethane bond. Further, the aliphatic polyester based resins synthesized by fermentation by microorganisms include polyhydroxybutyrate, copolymers of hydroxybutyrate and hydroxyvalerate.

In the present invention, the term "polylactic acid based resins" means homopolymers of D-lactic acid or L-lactic acid, or copolymers of these. Specifically, the polylactic acid based resins include poly(D-lactic acid) whose structural unit is D-lactic acid, poly(L-lactic acid) whose structural unit is L-lactic acid, and further, poly(DL-lactic acid) that is copolymers of L-lactic acid and D-lactic acid, and mixtures of these.

Aliphatic polyester based resins including polylactic acid based resins contain no aromatic rings in the molecular chain thereof and hence do not absorb ultraviolet rays. Therefore, the reflection films made therefrom do not deteriorate or yellow, thus causing no decrease in reflectance of the film.

The poly lactic acid based resins can be produced by known methods, such a condensation polymerization method and a ring opening polymerization method. For example, according to the condensation polymerization method, D-lactic acid, L-lactic acid, or mixtures of these are directly subjected to condensation polymerization with dehydration to obtain polylactic acid based resins having a desired composition. Further, in the case of ring opening polymerization method, a lactic acid based resin having any desired composition can be obtained from a lactide which is a cyclic dimer of lactic acid in the presence of a predetermined catalyst and using a modifier as necessary. The lactides include L-lactide, which is a dimer of L-lactic acid, D-lactide, which is a dimer of D-lactic acid, and DL-lactide, which consists of L-lactic acid and D-lactic acid. These can be mixed as necessary and polymerized to obtain polylactic acid based resins having any desired composition and crystallinity.

The polylactic acid based resins used in the present invention preferably have a compositional ratio of D-lactic acid to L-lactic acid such that D-lactic acid:L-lactic acid =100:0 to 85:15, or D-lactic acid:L-lactic acid=0:100 to 15:85, more preferably D-lactic acid:L-lactic acid=99.5:0.5 to 95:5, or D-lactic acid:L-lactic acid=0.5:99.5 to 5:95. The polylactic acid based resins having a compositional ratio of D-lactic acid to L-lactic acid of 100:0 or 0:100 have very high crystallinity, and high melting point, hence they tend to have excellent heat resistance and excellent mechanical properties. That is, such polylactic acid based resins are preferable since upon their drawing or heat treatment, the resins crystallize to improve the heat resistance and mechanical properties. On the other hand, the polylactic acid based resins made of D-lactic acid and L-lactic acid are preferable since they are imparted therewith flexibility and films obtained therefrom have improved molding stability and drawing stability. Therefore, taking into consideration the balance between the heat resistance of and the molding stability and drawing stability of the obtained film, it is more preferable that the polylactic acid based resins have a compositional ratio of D-lactic acid to L-lactic acid such that D-lactic acid:L-lactic acid=99.5:0.5 to 95:5, or D-lactic acid:L-lactic acid=0.5:99.5 to 5:95.

In the present invention, polylactic acid based resins with different copolymerization ratios of D-lactic acid to L-lactic acid may be blended. In this case, adjustment of the compositional ratios of the polylactic acid based resins such that an average value of the compositional ratios of a plurality of lactic acid based resins falls within the above-mentioned ranges of the compositional ratio can provide the above-mentioned balanced properties. Blending homopolymers of D-lactic acid and L-lactic acid and copolymers thereof makes it possible to have bleed stability and development of heat resistance well balanced.

The polylactic acid based resins used in the present invention preferably have high molecular weights, for example, weight average molecular weights of 10,000 or more, more preferably 60,000 or more and 400,000 or less, particularly preferably 100,000 or more and 300,000 or less. When the polylactic acid based resins have a weight average molecular weight of less than 10,000, the obtained film may have poor mechanical properties.

In recent years, liquid crystal displays have been used as displays for not only personal computers but also car navigation systems and car-mounted small television sets, so that those liquid crystal displays that are resistant to high temperatures and high humidities are demanded. For this reason, it is preferable that aliphatic polyester based resin reflection films contain a hydrolysis preventing agent to impart durability to the film.

The hydrolysis preventing agents that can be used advantageously in the present invention include carbodiimide compounds. Preferred examples of the carbodiimide compounds include those having a basic structure represented by the following general formula:

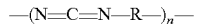

In the above formula, n is an integer of 1 or more, and R represents an organic linking unit. R may be, for example, an aliphatic linking unit, an alicyclic linking unit, or an aromatic linking unit. n is selected appropriately from integers of 1 to 50.

Specific examples of the carbodiimide compound include bis(dipropylphenyl)carbodiimide, poly(4,4'-diphenylmethanecarbodiimide), poly(p-phenylenecarbodiimide), poly(m-phenylenecarbodiimide), poly(tolylcarbodiimide), poly(diisopropylphenylenecarbodiimide), poly(methyl-diisopropylphenylenecarbodiimide), poly(triisopropylphenylenecarbodiimide) and so on, as well as corresponding monomers. These carbodiimide compounds may be used singly or as combinations of two or more of them.

In the present invention, it is preferable that the aliphatic polyester based resin that constitutes a film contains 0.1 to 3.0 mass parts of the carbodiimide compound per 100 mass parts of the resin. When the content of the carbodiimide compound is 0.1 mass part or more per 100 mass parts of the resin, the obtained film exhibits a sufficiently improved hydrolysis resistance. When the content of the carbodiimide compound is 3.0 mass parts or less per 100 mass parts of the resin, the obtained film is less colored to have high light reflecting properties.

The aliphatic polyester based resin reflection film of the present invention may further contain antioxidants, light stabilizers, heat stabilizers, lubricants, dispersants, ultraviolet absorbents, white pigments, fluorescent brighteners, and other additives so far as they do not damage the effects of the present invention.

Preferably, the aliphatic polyester based resin reflection film of the present invention has an average reflectance of 90% or more, more preferably 95% or more at a wavelength in the range of 420 nm to 700 nm. When the average reflectance of the film surface is 90% or more, the film has good reflecting properties and the screen of a liquid crystal display and the like with the film can realize sufficient brightness. The reflection film thus obtained has a predetermined reflectance with which the film can serve as an acceptable reflection film. Further, the aliphatic polyester based resin reflection film of the present invention preferably has an average reflectance of the film surface of 95% or more, more preferably 98% or more for light having a wavelength of 550 nm. When the average reflectance is 95% or more, the film exhibits good reflecting properties and can provide sufficient brightness to the screen of liquid crystal displays and the like.

The aliphatic polyester based resin reflection film of the present invention can retain an excellent average reflectance even after it is exposed to ultraviolet rays.

In cars parking under the scorching sun in summer seasons, car navigation systems, car-mounted small television sets and the like are subjected to high temperatures. Further, if liquid crystal display devices are used for many hours, the areas surrounding light source of the devices are subjected to high temperatures. Accordingly, the reflection film used in liquid displays for use in car navigation systems, liquid crystal display devices and the like are required to have heat resistance to temperatures at about 110° C. That is, the reflection film has a heat shrinkage factor of, preferably 10% or less, more preferably 5% or less when the film is left to stand at a temperature of 120° C. for 5 minutes. When the film has a heat shrinkage factor of more than 10%, the film may cause shrinkage with a lapse of time when used at high temperatures. Therefore, in the case of the reflection film that is laminated on a steel plate or the like, the film alone may be deformed. The film that underwent severe shrinkage may have a decreased surface area for reflection or a reduced porosity within the film, resulting in a decreased reflectance.

To prevent heat shrinkage, it is desirable to allow the crystallization of the film to proceed completely. Since it is difficult to promote the crystallization of the aliphatic polyester based resin reflection film completely by biaxial drawing only, it is preferable in the present invention that heat fixation treatment be performed after drawing. By promoting the crystallization of the film, it is possible to impart the film with heat resistance and improve the resistance to hydrolysis of the film.

Recently, there has been an increasing need for scaling up of liquid crystal displays and the like and larger reflection sheets have been demanded. For example, when a film is incorporated as a reflection sheet in a liquid crystal television set with a large screen, the film is required to serve as a reflection film that exhibits a small change in size after use for a long period of time since the film is used for a long time in a state exposed to light from a light source. Also, in the case of small or medium edge-light-type displays, when used in a state in which the end is constricted, a film that shows a small change in size is demanded. For example, the film has preferably a heat shrinkage factor after retention at 80° C. for 180 minutes of more than 0% and less than 0.7% in the longitudinal direction and −0.1% to 0.5% in the transverse direction. The film has more preferably a heat shrinkage factor after retention at 80° C. for 180 minutes of 0.001% to 0.3% in the transverse direction. Here, the longitudinal direction means a direction that is the same as the direction of flow of the film (direction in which the film is taken up), and the transverse direction means a direction that is perpendicular to the direction of flow of the film.

Therefore, it is preferable that the aliphatic polyester based resin reflection film of the present invention has a heat shrinkage factor in the above-mentioned ranges after its retention at 80° C. for 180 minutes. If the heat shrinkage factor of the reflection film is set to values in the above-mentioned ranges, deformation due to changes with time when used in the back of, for example, a large liquid crystal television set can be prevented, so that the planarity of the film can be retained. For example, by drawing a film and subsequently subjecting the film to relaxation treatment at an outlet of a tenter to impart the film with a predetermined amount of relaxation, the heat shrinkage factor of the film can be set in the above-mentioned ranges.

The aliphatic polyester based resin reflection film of the present invention can be degraded by, for example, microorganisms when subjected to earth filling, thus causing no problems of wastes. When aliphatic polyester based resins are subjected earth filling, the ester bonds in the resin are hydrolyzed to reduce the molecular weight of the resin to about 1,000 and the resultant is subsequently biodegraded by microorganisms in the soil.

On the other hand, the aromatic polyester based resin has high bond stability in the molecule, so that hydrolysis of the ester bonds can hardly take place. Hydrolysis can not occur to polypropylene based resins. Therefore, when the aromatic polyester based resin and polypropylene based resins are subjected to earth filling, neither their molecular weight is reduced nor their biodegradation by, for example, microorganisms occurs. As a result, various problems occur. For example, the aromatic polyester based resins and polypropylene based resins remain in the soil for a long time to make the service life of the landfill shorter, and natural landscape and life environment of wild animals and plants are damaged.

Hereinafter, an example of the method of producing an aliphatic polyester based resin reflection film of the present invention is explained. However, the present invention should not be considered to be limited thereto.

First, an aliphatic polyester based resin composition is prepared by blending an aliphatic polyester based resin with a fine powder filler, and/or high-purity titanium oxide, a hydrolysis preventing agent, and other additives as necessary. More particularly, the fine powder filler or the high-purity titanium oxide, and the hydrolysis preventing agent and the like as necessary are added to the aliphatic polyester based resin. The resultant is mixed in a ribbon blender, a tumbler, a Henschel mixer or the like and then kneaded using a single-screw or a twin-screw extruder or the like at a temperature equal to or higher than the melting temperature of the resin (for example, 170° C. to 230° C. in the case of polylactic acid) to give aliphatic polyester based resin composition. Alternatively, an aliphatic polyester based resin composition can be obtained by supplying the aliphatic polyester based resin, the fine powder filler, or the high-purity titanium oxide, the hydrolysis preventing agent and the like to the mixer or the like by separate feeders in respective predetermined amounts. Further, the aliphatic polyester based resin composition can also be obtained by preparing in advance a master batch obtained by blending a portion of the aliphatic polyester based resin with the fine powder filler or the high-purity titanium oxide, and the hydrolysis preventing agent and the like in large concentrations, and mixing the master batch with another portion of the aliphatic polyester based resin to desired concentrations of the components.

Then, the aliphatic polyester based resin composition thus obtained is melted and formed into a film. For example, the aliphatic polyester based resin composition is dried and then supplied to an extruder, is melted by being heated to a temperature equal to or higher than the melting temperature of the resin. Alternatively, the aliphatic polyester based resin composition can be supplied the extruder without drying. When the aliphatic polyester based resin composition is not dried, it is preferable that a vacuum vent be used when it is melt-extruded. The conditions of extrusion such as extrusion temperature must be set taking into consideration factors, for example, a reduction in molecular weight of the resin due to decomposition. For example, the extrusion temperature is preferably in the range of 170° C. to 230° C. for polylactic acid. Thereafter, the molten aliphatic polyester based resin composition is extruded from a slit-shaped discharge nozzle of a T-die and contacted with a cooling roll to solidify the composition to form a cast sheet.

The aliphatic polyester based resin reflection film of the present invention preferably is drawn at least monoaxially, and more preferably biaxially. Depending on the drawing conditions, it may be difficult to impart the film with reflecting properties or with sufficient heat resistance. Therefore, the drawing conditions are important.

In the case where the aliphatic polyester based resin reflection film of the present invention has pores therein, it is preferable to draw the obtained cast sheet to 5 times or more, more preferably 7 times or more as compared with the original size in terms of area magnification. By drawing the cast sheet 5 times or more in area magnification, a porosity of 5% or more can be realized in the film. By drawing the cast sheet 7 times or more in area magnification, a porosity of 20% or more can be realized. Further, by drawing the cast sheet 7.5 times or more in area magnification, a porosity of 30% or more can be realized. For example, by using titanium oxide as a fine powder filler and drawing the cast sheet 5 times or more in area magnification, a film having a porosity of 5% or more can be obtained. The film shows sufficient whitening to provide a sufficient reflectance of the film. When a filler other than titanium oxide is used as the fine powder filler, it is preferable that the porosity of the film is set to 20% or more.

In the case where it is difficult to realize an area magnification of 5 times or more by monoaxial drawing alone, an area magnification of 5 times or more can be achieved with ease by performing biaxial drawing. That is, by performing biaxial drawing, a film having a higher porosity can be obtained in a stable manner, with the result that the reflectance of the film can be increased. In addition, biaxial drawing of a film can increase the mechanical strength of the film and hence it is preferable that the film is drawn biaxially from the viewpoint of the mechanical strength of the film. In the case where the reflection film is required to have heat resistance, the biaxial drawing is preferable since when the film is drawn biaxially, heterogeneity in the direction in which the film is shrunk disappears.

When high-purity titanium oxide is used, it is preferable to draw the film 1.1 times or more at least monoaxially, more preferably biaxially. However, presence of porosity is not essential, so that the film may be either porous or nonporous.

The drawing temperature at which a cast sheet is drawn is preferably 50° C. or more and 90° C. or less for, for example, polylactic acid. When the drawing temperature is 50° C. or more, the film is not broken during drawing, while when the drawing temperature is 90° C. or less, less drawing orientation occurs, so that the porosity is not decreased.

For example, by drawing the aliphatic polyester based resin film of the present invention at a draw ratio appropriately selected, pores are formed in the film. This is because the aliphatic polyester based resin and the fine powder filler behave differently during drawing. More particularly, when drawing is performed at a drawing temperature suitable for the aliphatic polyester based resin, the aliphatic polyester based resin as a matrix is drawn in contrast to the fine powder filler that tends to remain as is, with the result that the separation of the aliphatic polyester based resin from the fine powder filler occurs at the boundary therebetween to form pores. With only monoaxial drawing of the film, the formed pores are in the form of fibers extending in one direction. On the other hand, biaxial drawing of the film gives rise to pores extending in both the longitudinal and transverse directions to give pores in the form of disks. In other words, biaxial drawing increases separation area at the boundary between the aliphatic polyester based resin and the fine powder filler to make whitening of the film to proceed. As a result, the film has an excellent reflectance as a reflection film.

The order of drawing in biaxial drawing is not particularly limited. For example, either simultaneous biaxial drawing or sequential biaxial drawing may be used. After melting film formation using a drawing installation, either drawing of the film in an MD (machine direction) by roll drawing and subsequent drawing in a TD (transverse direction) by tenter drawing, or biaxial drawing by tubular drawing may be performed.

In the present invention, to impart the aliphatic polyester based resin reflection film with heat resistance and dimension stability, it is preferable that heat fixation be performed after the drawing.

The processing temperature for heat fixation of the film is preferably 90° C. to 160° C., more preferably 110° C. to 140° C. Time required for heat fixation is preferably 1 second to 5 minutes. The drawing installation is not particularly limited. However, it is preferable that tenter drawing, in which heat fixation can be performed after drawing, be performed.

The thickness of the aliphatic polyester based resin reflection film is not particularly limited. The thickness is usually about 30 μm to about 500 μm and preferably about 50 μm to about 500 μm taking into consideration of handleability in practical applications. In particular, the thickness of a reflection film for use as a small, thin reflection plate is preferably 30 μm to 100 μm. Reflection films having such a thickness can be used in small, thin liquid crystal displays and the like in, for example, note-type personal computers and mobile phones and the like.

The reflection film of the present invention may be either of a single-layer (monolayer) structure or of a multi-layer structure which, for example, obtained by being laminated two or more layers.

The aliphatic polyester based resin reflection film of the present invention can be used to form a reflection plate for use in liquid crystal displays and the like. For example, the aliphatic polyester based resin reflection film can be applied to a metal plate or a resin plate to form a reflection plate. The reflection plate is useful as a reflection plate for use in liquid crystal display apparatus, illumination devices, illumination advertising displays. Hereinafter, an example of a method of producing such a reflection plate is explained. However, the present invention should not be considered to be limited thereto.

The methods of covering a metal plate or a resin plate with the reflection film of the present invention include a method that involves use of an adhesive, a method of heat fusing without using adhesives, a method of bonding through an adhesive sheet, a method of extrusion coating and so on and is not particularly limited. For example, the reflection film can be attached to a metal or resin plate by coating an adhesive made of polyester, polyurethane, epoxy resin or the like on a side of the metal or resin plate on which the reflection film is to be attached and then applying the reflection film on the adhesive. In this method, the adhesive is coated on the surface of the metal plate or the like to which the reflection film is to be applied to a thickness of about 2 μm to about 4 μm after drying by using a coating installation usually used, such as a reverse roll coater or a kiss roll coater. Then, the coated surface is dried and heated by an infrared ray heater and a hot-air circulating oven to maintain the surface of the plate at a predetermined temperature while the reflection film is applied promptly to the metal or resin plate by using a roll laminator, followed by cooling to obtain a reflection plate. In this case, it is preferable to maintain the surface of the metal plate or the like at 210° C. or less, since light reflecting properties of the reflection plate can be maintained at high levels.

In the present invention, "sheet" refers to a thin, flat product generally having a relatively small thickness as compared with length and width in accordance with the definition in Japanese Industrial Standards (JIS). On the other hand, "film" refers to a thin, flat product having a maximum thickness that is arbitrarily limited and is usually supplied in the form of a roll (Japan Industrial Standards JIS K-6900). Accordingly, among sheets those having particularly small thicknesses may be termed as films. However, there is no clear cut boundary between "sheet" and "film". In the present application, "films" may be understood as also including "sheets" vice versa.

EXAMPLE

Hereinafter, the present invention is explained in more detail by examples. However, the present invention should not be considered to be limited thereto. Instead, various applications or modifications may be made without departing the technical concept of the present invention. Measurements and evaluations in the following examples were performed. Here, the direction in which the film is taken up (direction of flow of film) is indicated by MD and the direction perpendicular thereto is indicated by TD.

(Measurement and Evaluation Methods)
(1) Average Particle Size

By using a powder specific surface measuring apparatus (permeation method), model "SS-100" manufactured by Shimadzu Corporation with a sample tube of 2 cm in cross section and 1 cm in height, measurement of time in which 20 cc of air was permeated through a 3 g sample packed in the sample tube at 500 mm $H_2O$ was repeated and an average particle size of the sample was calculated from the measured values.

(2) Heat Shrinkage Factor
Heat Shrinkage Factor "a":

100 mm-wide gauge lines were marked in MD and TD, respectively, of a film and the film was cut to provide sample films. The cut-out sample films were retained in a hot-air circulating oven at a temperature of 120° C. for 5 minutes and then a heat shrinkage of the sample films was measured. A ratio of the measured heat shrinkage to the original size (100 mm) of the sample films before placing them in the oven was expressed in percentage (%), which was defined as heat shrinkage factor (%).

Heat Shrinkage Factor "b":

200 mm-wide gauge lines were marked in MD and TD, respectively, of a film and the film was cut to provide sample films. The cut-out sample films were retained in a hot-air circulating oven at a temperature of 80° C. for 3 hours and then a heat shrinkage of the sample films was measured. A ratio of the measured heat shrinkage to the original size (200 mm) of the sample films before placing them in the oven was expressed in percentage (%), which was defined as heat shrinkage factor (%).

(3) Porosity (%)

The density of a film before drawing (indicated as "non-drawn film density") and the density of the film after drawing (indicated as "drawn film density") were measured and the measured values were assigned in the following equation to obtain the porosity of the film.

Porosity(%)={(Non-drawn film density−Drawn film density)/Non-drawn film density}×100

(4) Average Reflectance (%)
Average Reflectance "a" (Wavelength 400 nm to 700 nm):
By using a spectrophotometer ("U-4000", manufactured by Hitachi Instruments Service Co., Ltd.) with an integrating sphere, reflectance of a sample film taking the reflectance of a barium sulfate white plate as 100% was measured at intervals of 20 nm over a wavelength range of 400 nm to 700 nm. An average value of the measured values was calculated and the resultant was defined as an average reflectance at a wavelength of 400 nm to 700 nm.

Average Reflectance "b" (Wavelength 420 nm to 700 nm):
Reflectance of a sample film was measured in the same manner as the above-mentioned average reflectance "a" and among the obtained values, those values measured at a wavelength of 420 nm to 700 nm were used to obtain an average value. This value was defined as an average reflectance at a wave length of 420 nm to 700 nm.

(5) Reflectance (%)
By using a spectrophotometer ("U-4000", manufactured by Hitachi Instruments Service Co., Ltd.) with an integrating sphere, reflectance of a sample film for light at a wavelength of 550 nm was measured. In this case, the reflectance of a barium sulfate white plate was taken as 100%.

(6) Hydrolysis Resistance
In a homeostatic tank held at a temperature of 60° C. and a relative humidity of 95% RH, a film was left to stand for 300 hours or 1,000 hours, and then a weight average molecular weight of the aliphatic polyester based resin constituting the film was measured. The measured values were assigned in the following equation to obtain a molecular weight retention ratio (%), and evaluated for hydrolysis resistance based on the criteria set out below. Symbols "○" and "Δ" indicate that the values are equal to or higher than practical levels.

Molecular weight retention ratio(%)=(Weight average molecular weight after standing/Weight average molecular weight before standing)×100

Criteria of Evaluation:
○: Molecular weight retention ratio of 90% or more;
Δ: Molecular weight retention ratio of 60% or more and less than 90%;
x: Molecular weight retention ratio of less than 60%.

(7) Yellowing Preventing Properties
Film samples were irradiated with ultraviolet rays for 1,000 hours in a sunshine weatherometer tester, or for 180 hours in a xenon weatherometer tester. Thereafter, the film samples were observed with naked eye. By visual judgment, the film sample of which the color of the film surface was judged to be white was indicated as "white", and the film sample of which the color of the film surface was judged to be yellowish was indicated as "yellow".

Also, film samples after irradiation of ultraviolet rays were determined for average reflectance (%) according to the measurement method described in (4) above, and reflectance (%) was obtained according to the measurement method described in (5) above.

(8) Biodegradability
Biodegradability of films was determined based on the criteria set forth below.
Criteria of Evaluation:
x: Film that can be biodegraded by earth filling;
○: Film that can not be biodegraded by earth filling.

(9) Deadfold Property
Sample films of 20 mm wide and 150 mm long were cut out taking the longitudinal direction of the film as a width direction and the direction perpendicular thereto as a length direction. One of the shorter sides of the sample film thus obtained was held and another shorter side of the film (the other end), which was free, was folded at an angle of 180° at a position of 30 mm from the other end so that the straight line at this position constituted an outer folding line (or an inner folding line), and then a load of 0.15 MPa was applied. After applying a load of 0.15 MPa for 0.5 second, the load was immediately removed, the folded portion was opened, and the other end of the film sample was held by the hand and returned to the original position. Then, the film sample was released from the hand. Subsequently, an angle of the other end that was retained by the folding was measured. That is, an angle formed by the other end with respect to its original position when released from the hand was measured by a protractor. The obtained value is 180° at most and 0° at least. Larger values mean more excellent deadfold properties.

(10) Difference in Refractive Index Between Resin and Fine Powder Filler
A refractive index (n1) of a resin was measured according to the method "A" of JIS K-7142, while a refractive index (n2) of a fine powder filler was measured according to the method "B" of JIS K-7142. Note that in Comparative Example 1, the refractive indices of polyethylene terephthalate as the resin component and polymethylpentene as the filler component were measured according to the method "A" of JIS K-7142 after formation into a film. The refractive index of calcium carbonate as the filler component was measured according to the method "B" of JIS K-7142.

(11) Film Forming Properties
Evaluation was made of occurrence of a trouble such as breakage of film when the aliphatic polyester based resin composition was formed into a film based on evaluation criteria as set forth below.
Evaluation Criteria:
○: Film formation was performed in a stable manner, the composition having good film forming properties;
x: Breakage of film occurred from time to time, or frequently, the composition having poor film forming properties.

(12) Concentration (ppm) of Vanadium in Titanium Oxide
10 ml of nitric acid was added to 0.6 g of titanium oxide and the resultant was allowed to decompose in a microwave incineration apparatus for 80 minutes. The obtained solution was measured for concentration of vanadium by using an ICP emission spectrophotometer.

(13) Processability of Reflection Plate
Evaluation was made on three items, that is, right angle folding (R=0 mm), screw contact bending, and square type Erichsen (5 mm) based on the following criteria.
Evaluation Criteria:
○: No cracks occurred;
x: Cracks occurred.

(14) Reflecting Properties of Reflection Plate
Reflection plates were measured for reflectance (t) by using the same measuring method as described in (5) reflectance above.

(15) Practicality Evaluation Test
A fixing frame for a reflection sheet incorporated in the back light of a 21-inch liquid crystal television set manufactured by Hitachi Ltd. was used. A reflection plate was attached to this fixing frame in the same manner as it was actually attached to a liquid crystal television set. Then, after it was heated at 80° C. for 3 hours, the appearance of the reflection sheet was observed with naked eye. Evaluation was made based on the following criteria.
Evaluation Criteria:
"A" No change was observed in the appearance of the film after heating;

"B" A change was observed in the film after heating when observed visually, and unmeasurable unevenness of a height of less than 0.5 mm was recognized therein;
"C" Unevenness of a height of 0.5 mm or more and less than 1 mm was recognized in the film after heating;
"D" Unevenness of a height of 1 mm or more was seen in the film after heating.

Relaxation ratio is defined as below.

Transverse relaxation ratio=(Film width after relaxation)/(Film width before relaxation)

Longitudinal relaxation ratio=(Film speed before relaxation)/(Film speed after relaxation)

The polylactic acid based resins used in the examples were prepared as follows.

[Preparation of Polylactic Acid Based Resin (PLA) (1): L-Form Content 99.5%]

100 kg of L-lactide (trade name: PURASORB L) manufactured by Purac Japan Co., Ltd. to which 15 ppm tin octylate was added was charged in a 500-liter batch-type polymerization tank equipped with an agitator and a heater. Then, the polymerization tank was urged with nitrogen and polymerization was performed under conditions of a temperature of 185° C. and an agitation speed of 100 rpm for 60 minutes to obtain a melt. The obtained melt was supplied to a 40-mmφ equidirectional twin-screw extruder equipped with three stages of a vacuum vent, manufactured by Mitsubishi Heavy Industries, Ltd., and extruded into strands at 200° C. while evaporating volatile components at a vent pressure of 4 Torr to obtain pellets of a polylactic acid based resin.

The obtained polylactic acid based resin had a weight average molecular weight of 200,000, an L-form content of 99.5%, and a D-form content of 0.5%. The resin had a glass transition temperature (Tg) of 65° C.

Example I

Example I-1

Pellets of polylactic acid based resin (1) having a weight average molecular weight of 200,000 (D-form content of 0.5%, glass transition temperature of 65° C.) and calcium carbonate having an average particle size of 0.15 µm were mixed in a ratio of 50 mass %/50 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a so-called master batch. The master batch and polylactic acid based resin (1) were mixed in a ratio such that master batch: polylactic acid based resin (1)=40 mass %:60 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn at a temperature of 65° C. 3 times the original size in the MD and 3 times the original size in the TD, followed by heat treatment at 140° C. to obtain a reflection film of 188 µm thick. The obtained reflection film was measured and evaluated for heat shrinkage factor "a", porosity, average reflectance "a" before irradiation with ultraviolet rays, average reflectance "a" after irradiation with ultraviolet rays (wavelength of 400 nm to 700 nm), hydrolysis resistance, yellowing preventing properties (ultraviolet ray irradiation time by a sunshine weatherometer: 1,000 hours), biodegradability, and deadfold properties. Tables 1 and 2 show the results obtained.

Example I-2

Pellets of polylactic acid based resin (1) having a weight average molecular weight of 200,000 (D-form content of 0.5%, glass transition temperature of 65° C.) and barium sulfate having an average particle size of 0.7 µm were mixed in a ratio of 50 mass %/50 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a so-called master batch. The master batch and polylactic acid based resin (1) were mixed in a ratio such that master batch:polylactic acid based resin (1)=50 mass %:50 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn at a temperature of 65° C. 3 times the original size in the MD and 3 times the original size in the TD, followed by heat treatment at 140° C. to obtain a reflection film of 188 µm thick. The obtained reflection film was measured and evaluated in the same manner as that in Example I-1. Tables 1 and 2 show the results obtained.

Example I-3

Pellets of polylactic acid based resin (1) having a weight average molecular weight of 200,000 (D-form content of 0.5%, glass transition temperature of 65° C.) and calcium carbonate having an average particle size of 5 µm were mixed in a ratio such that polylactic acid based resin (1):calcium carbonate=60 mass %/40 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a so-called master batch. The master batch and polylactic acid based resin (1) were mixed in a ratio such that master batch:polylactic acid based resin (1)=60 mass %:40 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn 3 times the original size in the MD and 3 times the original size in the TD as shown in Table 3, followed by heat treatment at 140° C. to obtain a reflection film of 188 µm thick. The obtained reflection film was measured and evaluated in the same manner as that in Example I-1. Tables 1 and 2 show the results obtained.

Example I-4

Pellets of polylactic acid based resin (1) having a weight average molecular weight of 200,000 (D-form content of 0.5%, glass transition temperature of 65° C.) and barium sulfate having an average particle size of 0.7 µm were mixed in a ratio of 50 mass %/50 mass % to form a mixture. The resultant mixture was formed into pellets by using a twin-screw extruder to prepare a master batch. The master batch and polylactic acid based resin (1) were mixed in a ratio such that master batch:polylactic acid based resin (1)=50 mass %:50 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn at a temperature of 65° C. 3 times the original size in the MD and 3 times the original size in the TD as shown in Table 1, followed by heat treatment at 140° C. to obtain a reflection film of 188 μm thick. The obtained reflection film was measured and evaluated in the same manner as that in Example I-1. Tables 1 and 2 show the results obtained.

Comparative Example I-1

Polyethylene terephthalate and barium sulfate having an average particle size of 0.7 μm were mixed in a ratio of 50 mass %/50 mass % to form a mixture. The resultant mixture was formed into pellets by using a twin-screw extruder to prepare a master batch. The master batch and polyethylene terephthalate were mixed in a ratio of 50 mass %:50 mass % to prepare a resin composition. Thereafter, the resin composition was extruded through a T-die at 280° C. by using a single-screw extruder and the resultant was cooled and solidified to form a film. The obtained film was biaxially drawn at a temperature of 100° C. 3 times the original size in the MD and 3 times the original size in the TD, followed by heat treatment at 235° C. to obtain a reflection film of 188 μm thick. The obtained reflection film was measured and evaluated in the same manner as that in Example I-1. Tables 1 and 2 show the results obtained.

Comparative Example I-2

Polypropylene and barium sulfate having an average particle size of 0.7 μm were mixed in a ratio of 50 mass %/50 mass % to form a mixture. The resultant mixture was formed into pellets by using a twin-screw extruder to prepare a masterbatch. The master batch and polypropylene were mixed in a ratio of 50 mass %:50 mass % to prepare a resin composition. Thereafter, the resin composition was extruded through a T-die at 210° C. by using a single-screw extruder and the resultant was cooled and solidified to form a film. The obtained film was biaxially drawn at a temperature of 135° C. 3 times the original size in the MD and 3 times the original size in the TD, to obtain a reflection film of 188 μm thick. The obtained reflection film was measured and evaluated in the same manner as that in Example I-1. Tables 1 and 2 show the results obtained.

TABLE 1

| | Filler | | Draw Ratio (Time) | | | Heat Shrinkage a (%) | | | Average |
| | Kind*1 | Particle size (μm) | MD | TD | Thickness (μm) | MD | TD | Porosity (%) | reflectance (%) |
|---|---|---|---|---|---|---|---|---|---|
| Ex. I-1 | a | 0.15 | 3 | 3 | 188 | 2.3 | 2.0 | 35 | 95 |
| Ex. I-2 | b | 0.7 | 3 | 3 | 188 | 3.3 | 3.3 | 36 | 94 |
| Ex. I-3 | a | 5 | 3 | 3 | 188 | 3.0 | 3.2 | 30 | 92 |
| Ex. I-4 | b | 0.7 | 3 | 3 | 188 | 2.2 | 2.1 | 35 | 95 |
| C. Ex. I-1 | b | 0.7 | 3 | 3 | 188 | 0.5 | 0.5 | 32 | 93 |
| C. Ex. I-2 | b | 0.7 | 3 | 3 | 188 | 2.5 | 2.3 | 30 | 94 |

*1Kind of filler:
a Calcium carbonate
b Barium sulfate
Note:
"EX." means "Example"
"C. Ex." means "Comparative Example"
(hereinafter the same)

TABLE 2

| | Hydrolysis resistance | Color | Average reflectance (%) | Biodegrad-ability | Yellowing preventing property Deadfold property |
|---|---|---|---|---|---|
| Ex. I-1 | ○ | White | 94 | ○ | 95 |
| Ex. I-2 | ○ | White | 93 | ○ | 95 |
| Ex. I-3 | ○ | White | 92 | ○ | 95 |
| Ex. I-4 | Δ | White | 94 | ○ | 95 |
| C. Ex. I-1 | ○ | Yellow | 83 | X | 36 |
| C. Ex. I-2 | ○ | White | 94 | X | 12 |

Tables 1 and 2 indicate that the reflection films of Examples I-1 to I-3 of the present invention had a porosity of 30% or more and gave excellent results in all of heat shrinkage, average reflectance, hydrolysis resistance, yellowing preventing properties, biodegradability, and deadfold properties. The reflection film of Example I-4 in which no hydrolysis preventing agent was added was slightly poor in hydrolysis resistance but was still on practical levels and were excellent in all of the other evaluation items.

On the other hand, the films of Comparative Examples I-1 and I-2 which formed from the resins other than aliphatic polyester based resins revealed to have poor deadfold properties and poor biodegradability. The film of Comparative example I-1 formed from a resin having aromatic rings yellowed upon irradiation with ultraviolet rays and it was confirmed that the reflectance of this film was greatly decreased from the original value.

Example II

Example II-1

Pellets of polylactic acid based resin (1) having a weight average molecular weight of 200,000 (D-form content of 0.5%, glass transition temperature of 65° C.) and calcium carbonate having an average particle size of 5 μm were mixed in a ratio of 50 mass %/50 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a master batch. The master batch and polylactic acid based resin (1) were mixed in a ratio such that master batch:polylactic acid based resin (1)=60 mass %:40 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn 3 times the original size in the MD and 3 times the original size in the TD as shown in Table 3, followed by heat treatment at 140° C. to obtain a reflection film of 188 μm thick. The obtained reflection film was measured and evaluated for heat shrinkage factor "a", porosity, average reflectance "b" before irradiation with ultraviolet rays, average reflectance "b" after irradiation with ultraviolet rays (wavelength of 420 nm to 700 nm), hydrolysis resistance, yellowing preventing properties (ultraviolet ray irradiation time by a sunshine weatherometer: 1,000 hours), biodegradability, and deadfold properties. Tables 3 and 4 show the results obtained.

Example II-2

Pellets of polylactic acid based resin (1) having a weight average molecular weight of 200,000 (D-form content of 0.5%, glass transition temperature of 65° C.) and titanium oxide having an average particle size of 0.25 μm were mixed in a ratio of 50 mass %/50 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a master batch. The master batch and polylactic acid based resin (1) were mixed in a ratio such that master batch:polylactic acid based resin (1)=40 mass %:60 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn 3 times the original size in the MD and 3 times the original size in the TD as shown in Table 3, followed by heat treatment at 140° C. to obtain a reflection film of 188 μm thick. The obtained reflection film was measured and evaluated in the same manner as that in Example II-1. Tables 3 and 4 show the results obtained.

Example II-3

A reflection film was prepared in the same manner as that in Example II-2 except that in Example II-2, the thickness of the film was set to 250 μm as shown in Table 3. That is, in the same manner as that in Example II-2, the aliphatic polyester based resin composition was extruded through a T-die, cooled and solidified to form a film. Thereafter, the obtained film was drawn and subjected to heat treatment in the same manner as that in Example II-2 to obtain a reflection film of 250 μm thick. The obtained reflection film was measured and evaluated in the same manner as that in Example II-1. Tables 3 and 4 show the results obtained.

Example II-4

A reflection film was prepared in the same manner as that in Example II-2 except that in Example II-2, the thickness of the film was set to 80 μm as shown in Table 3. That is, in the same manner as that in Example II-2, the aliphatic polyester based resin composition was extruded through a T-die, cooled and solidified to form a film. Thereafter, the obtained film was drawn and subjected to heat treatment in the same manner as that in Example II-2 to obtain a reflection film of 80 μm thick. The obtained reflection film was measured and evaluated in the same manner as that in Example II-1. Tables 3 and 4 show the results obtained.

Example II-5

Pellets of polylactic acid based resin (1) having a weight average molecular weight of 200,000 (D-form content of 0.5%, glass transition temperature of 65° C.) and titanium oxide having an average particle size of 0.25 μm were mixed in a ratio of 50 mass %/50 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a master batch. The master batch and polylactic acid based resin (1) were mixed in a ratio such that master batch:polylactic acid based resin (1)=60 mass %:40 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn 3 times the original size in the MD and 3 times the original size in the TD as shown in Table 3, followed by heat treatment at 140° C. to obtain a reflection film of 80 μm thick. The obtained reflection film was measured and evaluated in the same manner as that in Example II-1. Tables 3 and 4 show the results obtained.

TABLE 3

| | Filler | | Draw ratio (Time) | | Thickness | Heat shrinkage factor "a" (%) | | Porosity | Average reflectance "b" |
|---|---|---|---|---|---|---|---|---|---|
| | Kind*[1] | Particle size (μm) | MD | TD | (μm) | MD | TD | (%) | (%) |
| Ex. I-1 | a | 0.15 | 3 | 3 | 188 | 2.3 | 2.0 | 35 | 97 |
| Ex. I-2 | b | 0.7 | 3 | 3 | 188 | 3.3 | 3.3 | 36 | 96 |
| Ex. I-4 | b | 0.7 | 3 | 3 | 188 | 2.2 | 2.1 | 35 | 96 |
| Ex. II-1 | a | 5 | 3 | 3 | 188 | 3.0 | 3.2 | 30 | 95 |
| Ex. II-2 | c | 0.25 | 3 | 3 | 188 | 2.0 | 1.9 | 15 | 98 |
| Ex. II-3 | c | 0.25 | 3 | 3 | 250 | 2.1 | 2.0 | 15 | 99 |
| Ex. II-4 | c | 0.25 | 3 | 3 | 80 | 2.1 | 2.1 | 15 | 97 |
| Ex. II-5 | c | 0.25 | 3 | 3 | 80 | 2.2 | 2.0 | 22 | 98 |
| C. Ex. I-1 | b | 0.7 | 3 | 3 | 188 | 0.5 | 0.5 | 32 | 93 |
| C. Ex. I-2 | b | 0.7 | 3 | 3 | 188 | 2.5 | 2.3 | 30 | 94 |

*[1]Kind of filler:

TABLE 3-continued

|  | Filler | | Draw ratio | | | Thickness | Heat shrinkage factor "a" (%) | | Porosity | Average reflectance "b" |
|---|---|---|---|---|---|---|---|---|---|---|
| Kind*¹ | Particle size (μm) | | (Time) MD | TD | | (μm) | MD | TD | (%) | (%) | a Calcium carbonate
b Barium sulfate
c Titanium oxide

TABLE 4

| | | Yellowing preventing property | | | |
|---|---|---|---|---|---|
| | Hydrolysis resistance | Color | Average reflectance 420-700 nm (%) | Biodegrad-ability | Deadfold property |
| EX. I-1 | ○ | White | 96 | ○ | 95 |
| EX. I-2 | ○ | White | 95 | ○ | 95 |
| EX. I-4 | Δ | White | 95 | ○ | 95 |
| EX. II-1 | ○ | White | 94 | ○ | 95 |
| EX. II-2 | ○ | White | 96 | ○ | 95 |
| EX. II-3 | ○ | White | 96 | ○ | 95 |
| EX. II-4 | ○ | White | 95 | ○ | 95 |
| EX. II-5 | ○ | White | 96 | ○ | 95 |
| C. EX. I-1 | ○ | Yellow | 83 | X | 36 |
| C. Ex. I-2 | ○ | White | 94 | X | 12 |

Tables 3 and 4 indicate that the reflection films of Examples I-1, I-2, II-1 to II-5 of the present invention gave excellent results in all of the average reflectance, hydrolysis resistance, yellowing preventing properties, biodegradability, and deadfold properties. In particular, the films of Examples II-2 to II-5 in which titanium oxide was used as the fine powder filler showed excellent average reflectance and yellowing preventing properties although they had a low porosity.

The reflection film of Example I-4 in which no hydrolysis preventing agent was added was slightly poor in hydrolysis resistance but was still on practical levels and was excellent in all of the other evaluation items.

On the other hand, the films of Comparative Examples I-1 and I-2 which formed by using the resins other than aliphatic polyester based resins revealed to have poor deadfold properties and poor biodegradability. The film of Comparative example I-1 formed from a resin having aromatic rings yellowed upon irradiation with ultraviolet rays.

Example III

Example III-1

Pellets of polylactic acid based resin (1) having a weight average molecular weight of 200,000 (D-form content of 0.5%, glass transition temperature of 65° C.) and calcium carbonate having an average particle size of 0.15 μm were mixed in a ratio of 50 mass %/50 mass % to form a mixture. Then, the resultant mixture was formed into pellets by using a twin-screw extruder to prepare a so-called master batch. The master batch and polylactic acid based resin (1) were mixed in a ratio such that master batch:polylactic acid based resin (1) 60 mass %:40 mass % to prepare an aliphatic polyester based resin composition. Thereafter, the aliphatic polyester based resin composition was extruded through a T-die at 220° C. by using a single-screw extruder and the resultant was cooled and solidified to form a film. The obtained film was biaxially drawn at a temperature of 65° C. 3 times the original size in the MD and 3 times the original size in the TD, followed by heat treatment at 140° C. to obtain a reflection film of 188 μm thick. The obtained reflection film was measured and evaluated for porosity, average reflectance "b" before irradiation with ultraviolet rays, average reflectance "b" after Irradiation with ultraviolet rays, yellowing preventing properties (ultraviolet ray irradiation time of 180 hours), and film forming properties. Tables 5 and 6 show the results obtained.

Example III-2

Pellets of polylactic acid based resin (1) having a weight average molecular weight of 200,000 (D-form content of 0.5%, glass transition temperature of 65° C.) and barium sulfate having an average particle size of 0.7 μm were mixed in a ratio of 50 mass %/50 mass % to form a mixture. Then, the resultant mixture was formed into pellets by using a twin-screw extruder to prepare a master batch. The master batch and polylactic acid based resin (1) were mixed in a ratio such that master batch:polylactic acid based resin (1)=80 mass %:20 mass % to prepare an aliphatic polyester based resin composition. Thereafter, the aliphatic polyester based resin composition was extruded through a T-die at 220° C. by using a single-screw extruder and the resultant was cooled and solidified to form a film. The obtained film was biaxially drawn at a temperature of 65° C. 3 times the original size in the MD and 3 times the original size in the TD, followed by heat treatment at 140° C. to obtain a reflection film of 188 μm thick. The obtained reflection film was measured and evaluated in the same manner as that in Example III-1. Tables 5 and 6 show the results obtained.

Example III-3

Pellets of polylactic acid based resin (1) having a weight average molecular weight of 200,000 (D-form content of 0.5%, glass transition temperature of 65° C.) and titanium oxide having an average particle size of 0.25 μm were mixed in a ratio of 50 mass %/50 mass % to form a mixture. Then, the resultant mixture was formed into pellets by using a twin-screw extruder to prepare a master batch. The master batch and polylactic acid based resin (1) were mixed in a ratio such that master batch:polylactic acid based resin (1)=40 mass %:60 mass % to prepare an aliphatic polyester based resin composition. Thereafter, the aliphatic polyester based resin composition was extruded through a T-die at 220° C. by using a single-screw extruder and the resultant was cooled and solidified to form a film. The obtained film was biaxially drawn at 65° C. 3 times the original size in the MD and 3 times the original size in the TD as shown in Table 5, followed by heat treatment at 140° C. to obtain a reflection film of 188 μm thick. The obtained reflection film was measured and evaluated in the same manner as that in Example III-1. Tables 5 and 6 show the results obtained.

Example III-4

Pellets of polylactic acid based resin (1) having a weight average molecular weight of 200,000 (D-form content of 0.5%, glass transition temperature of 65° C.) and zinc oxide having an average particle size of 0.4 μm were mixed in a ratio of 50 mass %/50 mass % to form a mixture. Then, the resultant mixture was formed into pellets by using a twin-screw extruder to prepare a master batch. The master batch and polylactic acid based resin (1) were mixed in a ratio such that master batch:polylactic acid based resin (1)=40 mass %:60 mass % to prepare an aliphatic polyester based resin composition. Thereafter, the aliphatic polyester based resin composition was extruded through a T-die at 220° C. by using a single-screw extruder and the resultant was cooled and solidified to form a film. The obtained film was biaxially drawn at 65° C. 3 times the original size in the MD and 3 times the original size in the TD as shown in Table 5, followed by heat treatment at 140° C. to obtain a reflection film of 188 μm thick. The obtained reflection film was measured and evaluated in the same manner as that in Example III-1. Tables 5 and 6 show the results obtained.

Comparative Example III-1

For comparison, commercially available products were evaluated. That is, a reflection sheet "Lumirror E60L" of 188 μm thick, manufactured by Toray Industries, Inc. was provided. The reflection sheet was measured and evaluated in the same manner as that in Example 1. Tables 5 and 6 show the results obtained.

Comparative Example III-2

Polypropylene and barium sulfate having an average particle size of 0.7 μm were mixed in a ratio of 50 mass %/50 mass % to form a mixture. The resultant mixture was formed into pellets by using a twin-screw extruder to prepare a masterbatch. The master batch and the barium sulfate were mixed in a ratio such that the concentration of sulfuric acid was 60 mass % to prepare a resin composition. Thereafter, the resin composition was extruded through a T-die at 210° C. by using a single-screw extruder and the resultant was cooled and solidified to form a film. The obtained film was biaxially drawn at a temperature of 135° C. 7 times the original size in the MD as shown in Table 5 to obtain a reflection film of 188 μm thick. The obtained reflection film was measured and evaluated in the same manner as that in Example III-1. Tables 5 and 6 show the results obtained.

The reflection film obtained in the above-mentioned Comparative Example I-1 was also measured and evaluated in the same manner as that in Example III-1. Tables 5 and 6 show the results obtained.

TABLE 5

| | | Resin*1 | | Filler*2 | | | Difference in refractive index ($\Delta n$) | Thickness (μm) | Draw ratio (Time) | |
|---|---|---|---|---|---|---|---|---|---|---|
| | Layer structure | Kind | Refractive index | Kind | Particle size (μm) | Amount (%) | | | MD | TD |
| EX. III-1 | Single layer | PLA | 1.45 | a | 0.15 | 30 | 0.15 | 188 | 3 | 3 |
| EX. III-2 | Single layer | PLA | 1.45 | b | 0.7 | 40 | 0.19 | 188 | 3 | 3 |
| EX. III-3 | Single layer | PLA | 1.45 | c | 0.25 | 20 | 1.25 | 188 | 3 | 3 |
| EX. III-4 | Single layer | PLA | 1.45 | d | 0.4 | 20 | 0.55 | 188 | 3 | 3 |
| C. EX. III-1 | Front and back layers | PET | 1.58 | a | — | — | 0.04 | 24 | — | — |
| | Middle layer | PET | 1.58 | e | — | — | 0.12 | 164 | — | — |
| C. EX. I-1 | Single layer | PET | 1.58 | b | 0.7 | 25 | 0.06 | 188 | 3 | 3 |
| C. EX. III-2 | Single layer | PP | 1.50 | b | 0.7 | 60 | 0.14 | 188 | 7 | — |

*1Kind of resin:
PLA—Polylactic acid
PET—Polyethylene terephthalate
PP—Polypropylene
*2Kind of filler:
a Calcium carbonate
b Barium sulfate
c Titanium oxide
d Zinc oxide
e Polymethylpenten

TABLE 6

Yellowing Preventing Property
(180 hours Irradiation)

|  | Porosity (%) | Average Reflectance "b" (%) | Color | Average Reflectance "b" (%) | ΔR | Evaluation | Film Forming Property |
|---|---|---|---|---|---|---|---|
| EX. III-1 | 35 | 97 | White | 97 | 0 | ○ | ○ |
| EX. III-2 | 36 | 97 | White | 97 | 0 | ○ | ○ |
| EX. III-3 | 30 | 98 | White | 98 | 0 | ○ | ○ |
| EX. III-4 | 30 | 96 | White | 96 | 0 | ○ | ○ |
| C. EX. III-1 | — | 95 | Yellow | 91 | 4 | X | — |
| C. EX. I-1 | 32 | 94 | Yellow | 91 | 3 | X | ○ |
| C. EX. III-2 | 35 | 97 | White | 97 | 0 | ○ | X |

Tables 5 and 6 indicate that the reflection films of Examples III-1 to III-4 of the present invention had a refractive index of main component resin of less than 1.50 and hence showed excellent results with respect to average reflectance, yellowing preventing properties, and film forming properties. The reflection films of Examples III-1 to III-4 had biodegradability. Therefore, when they were subjected to earth filling, they could be degraded by microorganisms (biodegraded) so that they caused no problem upon their disposal.

On the other hand, the films of Comparative Examples III-1 and III-2 as well as Comparative Example I-1 had, as main component resin, PET or PP that have a refractive index of 1.50 or more respectively, and hence were poor in biodegradability. In addition, these films were defective in at least one of the evaluation results. For example, the films of Comparative Examples III-1 and I-1 were poor in yellowing preventing properties whereas the film of Comparative Example III-2 was poor in film forming properties.

Example IV

Example IV-1

Pellets of polylactic acid based resin having a weight average molecular weight of 200,000 ("Nature Works 4032D", manufactured by Cargill-Dow Polymer; D-form content of 0.5%, glass transition temperature of 65° C.) and titanium oxide having an average particle size of 0.25 μm ("TIPAQUE PF-739" manufactured by Ishihara Sangyo Co., Ltd.; rutile type crystalline titanium oxide) were mixed in a ratio of 50 mass %/50 mass % to form a mixture. Hereinafter, Nature Works 4032D is referred to as "NW4032D". Three (3) mass parts of a hydrolysis preventing agent (bis(dipropylphenyl) carbodiimide) was added to 100 mass parts of the mixture and mixed. Then, the resultant mixture was formed into pellets by using a twin-screw extruder to prepare a so-called master batch. The master batch and polylactic acid based resin (NW4032D) were mixed in a ratio such that master batch: polylactic acid based resin (NW4032D)=40 mass %:60 mass % to prepare an aliphatic polyester based resin composition. Thereafter, the aliphatic polyester based resin composition was extruded through a T-die at 220° C. by using a single-screw extruder and the resultant was cooled and solidified to form a film. The obtained film was biaxially drawn at a temperature of 65° C. 2.5 times the original size in the MD and 2.8 times the original size in the TD, followed by heat treatment at 140° C. to obtain a reflection film of 188 μm thick. The obtained reflection film was measured and evaluated for porosity, reflectance before irradiation with ultraviolet rays with a wavelength of 550 nm, reflectance after irradiation with ultraviolet rays with a wavelength of 550 nm, hydrolysis resistance, yellowing preventing properties (ultraviolet ray irradiation time: 1,000 hours), biodegradability, deadfold properties, processability of reflection plate, and reflectance of a reflection plate. Tables 7 and 8 show the results obtained.

Example IV-2

A reflection film of 188 μm thick was prepared in the same manner as that in Example IV-1 except that in Example IV-1, "TIPAQUE PF-739" manufactured by Ishihara Sangyo Co., Ltd. was replaced by titanium oxide having an average particle size of 0.25 μm ("TIPAQUE CR-90-2" manufactured by Ishihara Sangyo Co., Ltd.; rutile type crystalline titanium oxide). The obtained reflection film was measured and evaluated in the same manner as that in Example IV-1. Tables 7 and 8 show the results obtained.

Example IV-3

A reflection film of 188 μm thick was prepared in the same manner as that in Example IV-1 except that in Example IV-1, "TIPAQUE PF-739" manufactured by Ishihara Sangyo Co., Ltd. was replaced by titanium oxide having an average particle size of 0.25 μm ("TIPAQUE PF711" manufactured by Ishihara Sangyo Co., Ltd.; rutile type crystalline titanium oxide). The obtained reflection film was measured and evaluated in the same manner as that in Example IV-1. Tables 7 and 8 show the results obtained.

Example IV-4

A reflection film of 250 μm thick was prepared in the same manner as that in Example IV-1 except that in Example IV-1, the thickness of the film was set to 250 μm. The obtained reflection film was measured and evaluated in the same manner as that in Example IV-1. Tables 7 and 8 show the results obtained.

Example IV-5

A reflection film of 80 μm thick was prepared in the same manner as that in Example IV-1 except that in Example IV-1, the draw ratio was changed to 3 times the original size in the MD and 3.2 times the original size in the TD and the film thickness was changed to 80 μm. The obtained reflection film was measured and evaluated in the same manner as that in Example IV-1. Tables 7 and 8 show the results obtained.

Example IV-6

Pellets of "Nature Works 4032D" and titanium oxide having an average particle size of 0.25 μm ("TIPAQUE PF-739"

manufactured by Ishihara Sangyo Co., Ltd.) were mixed in a ratio of 50 mass %/50 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a master batch. The master batch and polylactic acid based resin (NW4032D) were mixed in a ratio such that master batch:polylactic acid based resin (NW4032D)=60 mass %:40 mass % to prepare an aliphatic polyester based resin composition. Thereafter, the aliphatic polyester based resin composition was extruded through a T-die at 220° C. by using a single-screw extruder and the resultant was cooled and solidified to form a film. The obtained film was biaxially drawn at a temperature of 65° C. 3 times the original size in the MD and 3.2 times the original size in the TD, followed by heat treatment at 140° C. to obtain a reflection film of 80 μm thick. The obtained reflection film was measured and evaluated in the same manner as that in Example IV-1. Tables 7 and 8 show the results obtained.

Comparative Example IV-1

Pellets of polyethylene terephthalate and titanium oxide having an average particle size of 0.25 μm ("TIPAQUE PF-739" manufactured by Ishihara Sangyo Co., Ltd.) were mixed in a ratio of 50 mass %/50 mass % to form a mixture. The resultant mixture was formed into pellets by using a twin-screw extruder to prepare a master batch. The master batch and polyethylene terephthalate were mixed in a ratio such that master batch:polyethylene terephthalate=40 mass %:60 mass % to prepare a resin composition. Thereafter, the resin composition was extruded through a T-die at 280° C. by using a single-screw extruder and the resultant was cooled and solidified to form a film. The obtained film was biaxially drawn at a temperature of 90° C. 2.5 times the original size in the MD and 2.8 times the original size in the TD, followed by heat treatment at 140° C. to obtain a reflection film of 188 μm thick. The obtained reflection film was measured and evaluated in the same manner as that in Example IV-1. Tables 7 and 8 show the results obtained.

Example IV-7

A reflection film of 188 μm thick was prepared in the same manner as that in Example IV-1 except that in Example IV-1, "TIPAQUE PF-739" manufactured by Ishihara Sangyo Co., Ltd. was replaced by titanium oxide having an average particle size of 0.25 μm ("TITANIX JR-805" manufactured by Tayca Corporation; rutile type crystalline titanium oxide). The obtained reflection film was measured and evaluated in the same manner as that in Example IV-1. Tables 7 and 8 show the results obtained.

Example IV-8

A reflection film of 188 μm thick was prepared in the same manner as that in Example IV-1 except that in Example IV-1, "TIPAQUE PF-739" manufactured by Ishihara Sangyo Co., Ltd. was replaced by titanium oxide having an average particle size of 0.25 μm ("KRONOS KR470" manufactured by Titan Kogyo Kabushiki Kaisha; rutile type crystalline titanium oxide). The obtained reflection film was measured and evaluated in the same manner as that in Example IV-1. Tables 7 and 8 show the results obtained.

Example IV-9

The reflection film obtained in Example IV-1 was applied to a zinc-plated steel plate (0.45 mm thick) to prepare a reflection plate. That is, first a polyester based adhesive (commercially available product) was coated on a surface of the steel plate on which the reflection film was to be applied to a thickness of 2 to 4 μm after drying. Then, the coated surface was dried and heated by using an infrared heater and a hot-air oven. While maintaining the surface temperature of the steel plate at 180° C., the reflection film was promptly applied to the surface of the steel plate by using a roll laminator and the resultant was cooled to prepare a reflection plate. The obtained reflection plate was measured for processability of reflection plate and reflectance of reflection plate and evaluated. Table 9 shows the results obtained.

Example IV-10

A reflection plate was prepared in the same manner as in Example IV-9 except that in Example IV-9, the surface temperature of the steel plate was maintained at 220° C. instead of 180° C. The obtained reflection plate was measured and evaluated in the same manner as that in Example IV-9. Table 9 shows the results obtained.

TABLE 7

| | Resin | | Filler | | | Thickness | |
|---|---|---|---|---|---|---|---|
| | Kind | Refractive index | Kind*[1] | Particle size (μm) | Vanadium (ppm) | of sheet (μm) | Porosity (%) |
| Ex. IV-1 | PLA | 1.45 | a | 0.25 | 1 | 188 | 15 |
| EX. IV-2 | PLA | 1.45 | b | 0.25 | 0.5 | 188 | 15 |
| EX. IV-3 | PLA | 1.45 | c | 0.25 | 0.5 | 188 | 12 |
| EX. IV-4 | PLA | 1.45 | a | 0.25 | 1 | 250 | 15 |
| EX. IV-5 | PLA | 1.45 | a | 0.25 | 1 | 80 | 20 |
| EX. IV-6 | PLA | 1.45 | a | 0.25 | 1 | 80 | 20 |
| EX. IV-7 | PLA | 1.45 | d | 0.30 | 6 | 188 | 15 |
| EX. IV-8 | PLA | 1.45 | e | 0.30 | 6 | 188 | 15 |
| C. EX. IV-1 | PET | 1.58 | a | 0.25 | 1 | 188 | 15 |

*[1]Kind of filler:
a TIPAQUE PF739 (Rutile type crystalline titanium oxide, manufactured by Ishihara Sangyo Co., Ltd.)
b TIPAQUE CR90-2 (Rutile type crystalline titanium oxide, manufactured by Ishihara Sangyo Co., Ltd.)
c TIPAQUE PF711 (Rutile type crystalline titanium oxide, manufactured by Ishihara Sangyo Co., Ltd. )
d TITANIX JR-805 (Rutile type crystalline titanium oxide, manufactured by Tayca Corporation)
e KRONOS KR470 (Rutile type crystalline titanium oxide, manufactured by Titan Kogyo Kabushiki Kaisha)

"TIPAQUE PF-739" manufactured by Ishihara Sangyo Co.,

TABLE 8

| | Reflectance (%) | Hydrolysis resistance | Yellowing preventing property Color | Reflectance (%) | Biodegrad-ability | Deadfold property |
|---|---|---|---|---|---|---|
| EX. IV-1 | 98.5 | ○ | White | 96.5 | ○ | 95 |
| EX. IV-2 | 98.5 | ○ | White | 97.5 | ○ | 95 |
| EX. IV-3 | 98.5 | ○ | White | 97.5 | ○ | 95 |
| EX. IV-4 | 99.0 | ○ | White | 97.0 | ○ | 95 |
| EX. IV-5 | 98.0 | ○ | White | 96.0 | ○ | 95 |
| EX. IV-6 | 98.5 | ○ | White | 96.5 | ○ | 95 |
| EX. IV-7 | 95.0 | ○ | White | 92.5 | ○ | 95 |
| EX. IV-8 | 95.0 | ○ | White | 92.5 | ○ | 95 |
| C. EX. V-1 | 94.0 | ○ | Yellow | 89.0 | X | 36 |

TABLE 9

| | Processability of reflection plate | | | Reflectance of reflection plate (%) |
|---|---|---|---|---|
| | Right angle bendig | Screw bending | Erichsen | |
| Ex. IV-9 | ○ | ○ | ○ | 98.5 |
| Ex. IV-10 | ○ | ○ | ○ | 95.0 |

Tables 7 and 8 indicate that the reflection films of Examples IV-1 to IV-8 of the present invention retained a reflectance of 90% or more even after the irradiation with ultraviolet rays and had high reflectance and high yellowing preventing properties. Further, the films had excellent hydrolysis resistance and excellent deadfold properties (configuration retention) and had also had biodegradability. In particular, the films of Examples IV-1 to IV-6 containing titanium oxide with a vanadium content of 5 ppm or less revealed to be excellent since they had an initial reflectance as high as 98% or more and showed a less (2% or less) decrease in reflectance after the irradiation with ultraviolet rays, maintaining a reflectance of 96% or more after the irradiation of the films with ultraviolet rays.

The reflection films of Examples IV-5 to IV-6 could gain a considerably high reflectance even when they had a small thickness as thin as 80 μm, which suggests that they can be used satisfactorily as reflection films for use in small, thin liquid crystal displays for note-type personal computers and mobile phones and the like.

On the other hand, the reflection film of Comparative Example IV-1 including PET mixed with titanium oxide revealed to have poor yellowing preventing properties and poor deadfold property (configuration retention).

Table 9 indicates that the reflection plates of Examples IV-9 and IV-10 retained sufficient adhesion required for processing and high reflectance.

It revealed that the reflection plate of example IV-9 maintained reflectance better than the reflection plate of Example IV-10. In recent years, the reflection plate of a liquid crystal display is often required to have high reflectance in order to increase the performance of the backlight unit by supplying as much as possible light to the liquid crystal for responding to the need of scaling up of the screen and increase in the performance of display. The reflection films of the present invention can achieve such a high reflectance.

Example V

Example V-1

Pellets of polylactic acid based resin having a weight average molecular weight of 200,000 ("NW4032D", manufactured by Cargill-Dow) and titanium oxide having an average particle size of 0.25 μm were mixed in a ratio of 50 mass %/50 mass % to form a mixture. Three (3) mass parts of a hydrolysis preventing agent (bis(dipropylphenyl)carbodiimide) was added to 100 mass parts of the mixture and mixed. Then, the resultant mixture was formed into pellets by using a twin-screw extruder to prepare a so-called masterbatch. The masterbatch and polylactic acid based resin (NW4032D) were mixed in a ratio such that master batch:polylactic acid based resin (NW4032D) 40 mass %:60 mass % to prepare an aliphatic polyester based resin composition. Thereafter, the aliphatic polyester based resin composition was extruded through a T-die at 230° C. by using a single-screw extruder and the resultant was cooled and solidified to form a film. The obtained film was biaxially drawn 2.5 times the original size in the MD at a temperature of 65° C. Thereafter, relaxation treatment was performed such that a relaxation ratio of 0.990 was achieved at the outlet of the tenter. Further, in the transverse direction, the obtained film was drawn 3.0 times the original size at a temperature of 70° C., followed by relaxation treatment such that a relaxation ratio of 0.993 was achieved at the outlet of the tenter to finally obtain a film of 250 μm thick. The obtained reflection film was measured and evaluated for heat shrinkage factor "b" after storage at 80° C. for 3 hours for both the longitudinal and transverse directions. In addition, the obtained reflection film was evaluated by implementation tests. Table 10 shows the results obtained.

Examples V-2 to V-26

Reflection films of Examples V-2 to V-26 were prepared in the same manner as that in Example V-1 except that in Example V-1, the longitudinal relaxation ratio and transverse relaxation ratio were changed as indicated in Tables 10 to 14. The obtained reflection films were measured and evaluated in the same manner as that in Example V-1. Tables 10 to 14 show the results obtained.

TABLE 10

| | Ex. V-1 | EX. V-2 | Ex. V-3 | Ex. V-4 | Ex. V-5 | Ex. V-6 |
|---|---|---|---|---|---|---|
| Longitudinal relaxation | 0.990 | 0.990 | 0.990 | 0.996 | 0.996 | 0.992 |
| Transverse relaxation | 0.993 | 0.996 | 1.014 | 1.014 | 1.000 | 1.000 |
| 80° C., 3 hr Longitudinal shrinkage factor (%) | 0.38 | 0.03 | 0.03 | 0.68 | 0.53 | 0.60 |
| 80° C., 3 hr | −0.08 | 0.00 | 0.03 | 0.08 | 0.23 | 0.18 |

TABLE 10-continued

|  | Ex. V-1 | EX. V-2 | Ex. V-3 | Ex. V-4 | Ex. V-5 | Ex. V-6 |
|---|---|---|---|---|---|---|
| Transverse shrinkage factor (%) |  |  |  |  |  |  |
| Usability evaluation | B | B | A | A | A | A |

TABLE 11

|  | Ex. V-7 | Ex. V-8 | Ex. V-9 | Ex. V-10 | Ex. V-11 | Ex. V-12 |
|---|---|---|---|---|---|---|
| Longitudinal relaxation | 0.990 | 0.985 | 0.986 | 0.986 | 0.988 | 0.989 |
| Transverse relaxation | 1.000 | 0.978 | 0.964 | 0.986 | 0.971 | 0.986 |
| 80° C., 3 hr Longitudinal shrinkage factor (%) | 0.65 | 0.25 | 0.40 | 0.18 | 0.25 | 0.48 |
| 80° C., 3 hr Transverse shrinkage factor (%) | 0.03 | −0.25 | −0.38 | −0.23 | −0.33 | −0.40 |
| Usability evaluation | A | C | D | C | D | D |

TABLE 12

|  | EX. V-13 | EX. V-14 | EX. V-15 | EX. V-16 | EX. V-17 | EX. V-18 |
|---|---|---|---|---|---|---|
| Longitudinal relaxation | 0.989 | 0.990 | 0.990 | 0.990 | 0.990 | 0.990 |
| Transverse relaxation | 0.971 | 0.964 | 0.971 | 0.978 | 0.978 | 0.986 |
| 80° C., 3 hr Longitudinal shrinkage factor (%) | 0.58 | 0.70 | 0.58 | 0.48 | 0.48 | 0.45 |
| 80° C., 3 hr Transverse shrinkage factor (%) | −0.38 | −0.45 | −0.43 | −0.43 | −0.40 | −0.20 |
| Usability evaluation | D | D | D | D | D | C |

TABLE 13

|  | EX. V-19 | EX. V-20 | EX. V-21 | EX. V-22 |
|---|---|---|---|---|
| Longitudinal relaxation | 0.990 | 0.990 | 0.990 | 0.996 |
| Transverse relaxation | 0.989 | 0.990 | 0.988 | 0.993 |
| 80° C., 3 hr Longitudinal shrinkage factor (%) | 0.43 | 0.35 | 0.40 | 0.80 |
| 80° C., 3 hr Transverse shrinkage factor (%) | −0.25 | −0.30 | −0.25 | −0.53 |
| Usability evaluation | C | D | C | D |

TABLE 14

|  | EX. V-23 | EX. V-24 | EX. V-25 | EX. V-26 |
|---|---|---|---|---|
| Longitudinal relaxation | 0.999 | 0.988 | 0.985 | 0.987 |
| Transverse relaxation | 0.963 | 1.000 | 1.000 | 1.007 |
| 80° C., 3 hr | 1.30 | 0.35 | 0.35 | 0.25 |

TABLE 14-continued

|  | EX. V-23 | EX. V-24 | EX. V-25 | EX. V-26 |
|---|---|---|---|---|
| Longitudinal shrinkage factor (%) |  |  |  |  |
| 80° C., 3 hr | 0.08 | −0.22 | −0.28 | −0.23 |
| Transverse shrinkage factor (%) |  |  |  |  |
| Usability evaluation | D | C | C | C |

Tables 10 to 14 indicate that when the relaxation ratio were set to 0.990 to 0.996 for longitudinal relaxation ratio and 1.000 to 1.014 for transverse relaxation ratio, that is, a transverse relaxation is not performed or a slightly drawing in the transverse direction is performed, reflection films having very small shrinkage factors could be obtained after storage at 80° C. for 3 hours. By increasing the relaxation ratio (decreasing the value starting from 1), the longitudinal shrinkage factor was decreased. However, from a certain point, transverse expansion was expanded. When expansion in the transverse direction occurred, evaluations of the reflection films in the implementation tests were decreased. Further, when relaxation was performed in the transverse direction, the expansion tended to augment in the transverse direction. Accordingly, it was found that performing no relaxation or keeping a slightly drawn state in the transverse direction provided good results.

From the above, it followed that when longitudinal relaxation and transverse relaxation in the above-mentioned ranges were performed, the reflection films after standing at 80° C. for 3 hours had a longitudinal shrinkage factor of more than 0% and less than 0.7% and a transverse shrinkage factor of 0.001% or more and 0.3% or less, which were the best results among those obtained of the evaluations made in the implementation tests. That is, moderate longitudinal relaxation and/or transverse relaxation can realize films having very small shrinkage factors and provide films that show substantially no change in size even if the temperature increases as a result of a prolonged use as a reflection film in, for example, a liquid crystal television set with a large screen.

(Advantageous Effects of the Invention)

As described in detail in the foregoing, according to the present invention, a reflection film that can be used for a reflection plate and the like for use in liquid displays can be obtained. The reflection film exhibits the functions of the conventional reflection film or sheet sufficiently. The film of the present invention does not under yellowing or reduction in reflectance during use but have excellent deadfold property. In addition, the reflection film of the present invention generates less calorific when it is incinerated, and can be degraded by microorganisms and the like (biodegradable) when it is subjected to earth filling, thus raising no problem of waste disposal.

Industrial Applicability

The present invention is applicable to a reflection film for use in a reflection plate in liquid crystal displays, lighting equipment, illumination advertising displays and the like.

The invention claimed is:
1. An aliphatic polyester based resin reflection film comprising:
   an aliphatic polyester based resin; and
   a fine powder filler, wherein the fine powder filler has a refractive index of 1.6 or more,
   wherein a content of the fine powder filler is 10 mass parts or more and 60 mass parts or less per 100 mass parts of the aliphatic polyester based resin composition comprising the fine powder filler and the aliphatic polyester based resin, wherein the aliphatic polyester based resin is a polylactic, acid based resin having a compositional ratio of D-lactic acid to L-lactic acid such that D-lactic acid:L-lactic acid=99.5:0.5 to 95:5 or D-lactic acid:L-lactic acid=0.5: 99.5 to 5:95, wherein the film has pores therein at a porosity of 5% or more and 50% or less, and wherein the aliphatic polyester based resin has a refractive index of less than 1.50, and wherein the film has an average reflectance of 95% or more at a wavelength in the range of 420 nm to 700 nm.

2. The aliphatic polyester based resin reflection film according to claim 1, wherein the fine powder filler contains at least titanium oxide.

3. The aliphatic polyester based resin reflection film according to claim 1, wherein the titanium oxide is titanium oxide with a vanadium content of 5 ppm or less.

4. The aliphatic polyester based resin reflection film according to any one of claims 1 to 3, wherein a difference between the refractive index of the aliphatic polyester based resin and a refractive index of the fine powder filler is 0.15 or more.

5. The aliphatic polyester based resin reflection film according to any one of claims 1 to 3, wherein the porosity of the film is 5% or more and 50% or less.

6. The aliphatic polyester based resin reflection film according to any one of claims 1 to 3, wherein the aliphatic polyester based resin reflection film is a film obtained by melting an aliphatic polyester based resin composition comprising the aliphatic polyester based resin and the fine powder filler, and molding the melt into a film, and drawing the resultant film at least monoaxially at an area ratio of at least 5 times based on an original area of the film.

7. The aliphatic polyester based resin reflection film according to any one of claims 1 to 3, wherein the aliphatic polyester based resin reflection film after storage at 80° C. for 3 hours has a shrinkage factor of more than 0% and less than 0.7% in a longitudinal direction, and −0.1% or more and 0.5% or less in a transverse direction.

* * * * *